US012450651B2

(12) United States Patent
Samiec (10) Patent No.: US 12,450,651 B2
(45) Date of Patent: Oct. 21, 2025

(54) AUCTION SYSTEM INCORPORATING BLOCKCHAIN, SMART CONTRACTS AND ALGORITHM

(71) Applicant: Marcin Marek Samiec, Wroclaw (PL)

(72) Inventor: Marcin Marek Samiec, Wroclaw (PL)

( * ) Notice: Subject to any disclaimer, the term of this patent is extended or adjusted under 35 U.S.C. 154(b) by 150 days.

(21) Appl. No.: 18/142,125

(22) Filed: May 2, 2023

(65) Prior Publication Data

US 2024/0370920 A1   Nov. 7, 2024

(51) Int. Cl.
| | | |
|---|---|---|
| *G06Q 30/08* | (2012.01) | |
| *G06Q 20/12* | (2012.01) | |
| *G06Q 20/36* | (2012.01) | |
| *G06Q 20/38* | (2012.01) | |

(52) U.S. Cl.
CPC ......... *G06Q 30/08* (2013.01); *G06Q 20/1235* (2013.01); *G06Q 20/3672* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 2020/0160289 A1* | 5/2020 | Mahajan | G06Q 20/02 |
| 2021/0174432 A1* | 6/2021 | Gonnaud | G06Q 20/401 |
| 2021/0350459 A1* | 11/2021 | Goodman | G06F 18/214 |
| 2022/0366486 A1* | 11/2022 | Mccoy | H04L 9/3239 |
| 2023/0274326 A1* | 8/2023 | Yeung | G06Q 20/12 |
| | | | 705/26.1 |
| 2023/0281705 A1* | 9/2023 | Aviv | G06Q 30/0601 |
| | | | 705/26.3 |

FOREIGN PATENT DOCUMENTS

WO   WO-2023136585 A1 * 7/2023 ............. G06Q 20/06

OTHER PUBLICATIONS

Shi, Z., et al., Integration of Blockchain and Auction Models: A Survey, Some Applications, and Challenges, IEEE Communications Surveys & Tutorials (vol. 25, Issue: 1, pp. 497-537) (Year: 2021).*

* cited by examiner

*Primary Examiner* — Clay C Lee (57) ABSTRACT

Disclosed in the present invention an auction system incorporating blockchain and smart contracts and algorithm, which operates using block-chain, algorithm and smart contracts and non-fungible tokens and fungible tokens built on EVM compliant blockchains and off-chain service. The auction system that has the Auction Smart Contract deployed on all supported blockchain and the web pages that allow to create the auction, bid, store auction calculation, withdraw tokens, and move bought items to the wallet, and display auction statistics and a Statistics and Bridge Service that calculates each auction statistics and the result using the algorithm.

13 Claims, 5 Drawing Sheets

| Parameter References ||
|---|---|
| No. | Description |
| 54 | Address of digital item |
| 55 | The method of 54 contract address to be called once an item is sold. |
| 56 | The auction start and end date (and time) |
| 57 | The minimum bid value |
| 58 | The minimum auction selling price |
| 59 | The max number of auction participants |
| 60 | The max number of auction winners |
| 61 | The prefer more buyers |
| 62 | The Seller Fees |
| 63 | The Participant Fees |
| 64 | The Participant Rewards |
| 65 | The Auction allowed currency |
| 66 | Allowed digital items types |

FIG. 5

AUCTION SYSTEM INCORPORATING BLOCKCHAIN, SMART CONTRACTS AND ALGORITHM

TECHNICAL FIELD

The present invention relates to the field auctioneering, and in particular to an auction system incorporating blockchain, smart contracts and algorithm, which operates using block-chain smart contracts and algorithm and non-fungible tokens and fungible tokens built on EVM compliant blockchains and off-chain service.

BACKGROUND

It is difficult for sellers to find the best price for digital goods/rights/services and at the same time to have a satisfying level of sales. The main difficulty is to guess whether the sale value would be bigger when selling a digital product at price A or when selling it for ⅕ of price A expecting the higher amount of copies sold. It's a problem of guessing upfront the price that would bring satisfying level of sales.

The problem exists as well when selling digital goods like (but not limited to)—digital art, digitized art, broadcast transmission, coupons or system access that could have its representation in the smart contracts.

There are millions of mentioned digital goods being unsold only because of price being not matched to buyer's financial capabilities. Even if the potential buyer is acquired by the selling store via advertising channels, that person decides not to start the process of buying due to the price not matching his expectations.

Companies tend to solve it by building separate selling and distribution channels, where the same item is sold at different prices and this way to propose flexible pricing models.

There are a few attempts to apply smart contracts in auction systems.

The South Korean patent application number KR102128476B1 of 2018 Mar. 19 discloses a system and method for trading power based on blockchain smart contract. The blockchain smart contract-based power transaction system includes a plurality of smart meters and a plurality of full node servers. The smart meter participates as a light node in the blockchain network, initiates an auction by sending and executing a smart contract with the auction conditions set by the seller who generated electricity to the blockchain, or the buyer who wants to purchase power checks the auction conditions It executes a smart contract to create a transaction for bidding and sends it to the blockchain network to try to bid. The full node server participates as a full node in the blockchain network to maintain all blockchain data, and adds the transaction sent by the smart meter to the blockchain by performing a consensus algorithm. In addition, it is created as a block as a transaction related to the auction transmitted by the smart meter and added to the blockchain.

The US patent publication number US20190087893A1 of 2016 May 06 discloses methods and systems for blockchain based segmented risk based securities. A method of providing for a secure financial transaction, the method including the steps of: (a) formulating the documentation associated with the financial transaction, including security for the transaction; (b) dividing the transaction into a series of segments, each segment having an associated expected risk profile and security profile; (c) for each segment, creating an indicative token describing the segment, including associated expected risk profile and security profile; (d) providing a block chain environment for storage of the indicative tokens.

However, the above prior art fails to disclose the subject matter being taught in the present art.

The auction system is a new innovative way to solve the problem of price matching acquired buyers' expectations. It calculates the number of copies sold and the single item price from the submitted offers (and the auction parameters) to get the best selling price in a dynamic way described later.

OBJECTS OF THE INVENTION

The main object of the invention is to provide an auction system that incorporates blockchain, smart contracts and algorithm.

The following summary is an explanation of some of the general inventive steps for the system, method, architecture and tools.

SUMMARY OF THE INVENTION

To accomplish the above objectives of the present invention, it has become necessary to provide a new and improved system and methods that uses the algorithm to satisfy two factors—amount of copies sold and the price, providing a way to find a fair price for both buyers and sellers.

Accordingly, the present invention provides an auction system that incorporates blockchain, smart contracts and algorithm.

During auction time the auction system informs the users about the auction bid statistics, current winners amount and the winning bid value calculated according to the described algorithm on the bid page. As a result of successful auction—all winners will be able to receive the sold digital item.

Some operations described herein can be implemented according to various embodiments.

This summary is not an extensive overview of the invention and does not intend to limit the scope beyond what is described and claimed as a summary.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

However, for a more complete understanding of the above listed features and advantages of the system, its design and process, reference should be made to the detailed description and the drawings.

BRIEF DESCRIPTION OF FIGURES

The novel features believed to be characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings.

These and other features, and advantages of the present invention will become apparent from the following detailed description, the accompanying drawings, and the appended claims.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another.

The Auction system is a new innovative way to solve the problem of price matching acquired buyer's expectations.

Figure 1:
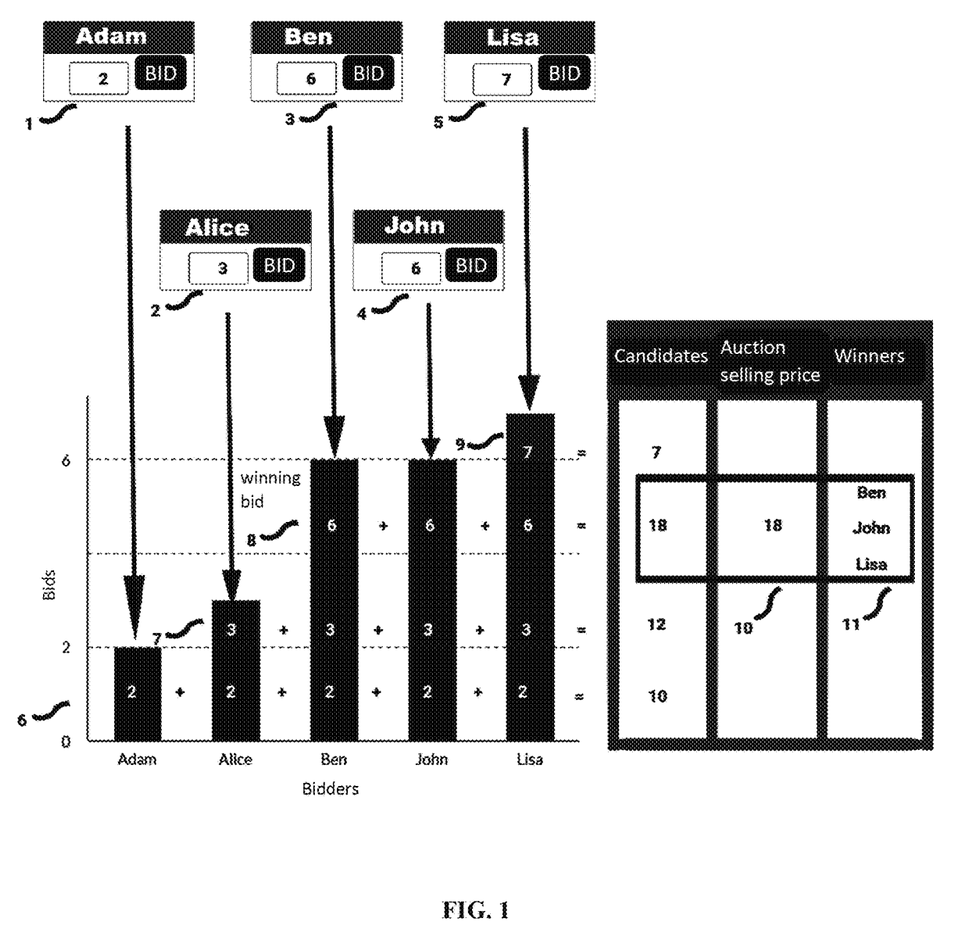
FIG. 1 is the structural representation of the present utility model in theoretical bid operation as described in the present invention.
Figure 2:
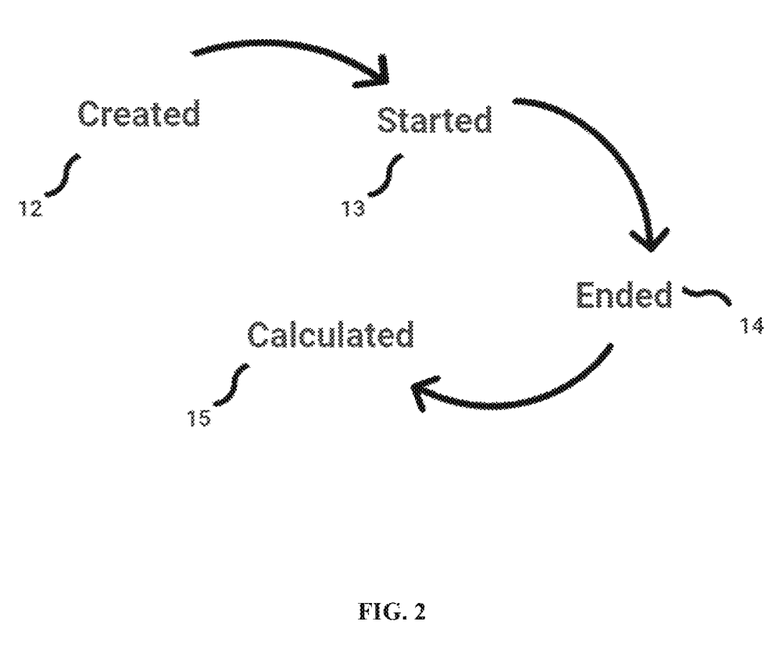
FIG. 2 is an illustration of the flow of the auction status.

In one general embodiment according to FIG. 2, the present invention describes an auction system that incorporates blockchain, smart contracts and algorithm, and FIG. 1 shows a bidding operation as a structural representation of the present utility model.

It uses the algorithm to satisfy two factors—amount of copies sold and the single item price, providing a way to find a fair price for both buyers and sellers.

The auction system solves that 'single item price vs amount of copies sold' problem—by creating the algorithm that finds the best price and discovers auction winners together with the winning bid price (item price) by providing a way to balance the price with the number of items sold.

That price discovery with regards to the amount of copies sold could be especially helpful in a digital items market like NFTs market where the Auction System could allow bidders to shape the market by combining the amount of copies sold and the digital item price in a way that matches both buyers and sellers' expectations.

When the market sees the NFT (or any other smart contract) to be split among many bidders (and become fungible tokens) for lower price—the algorithm will allow that. However, if a single buyer would like to have the only copy of the digital item (non-fungible token)—it is also possible in a dynamic way described later.

The auction system is a type of auction where bidders put their offers independently within an auction period.

Bid value provided by the auction participant is the maximum price that the participant is willing to pay in exchange for a digital copy of the item.

The auction system does not limit participants' bids depending on other bidders' bid values—e.g. to bid higher than the last bidder.

It allows all participants to put a bid that is an independent offer, immediately transferred on the Auction Smart Contract and blocked till the end of the auction.

During auction time the auction system will inform on the Bid Page about the auction bid statistics, current winners amount and the winning bid value, calculated according to the described algorithm. As a result of successful auction—all winners will be able to receive the sold digital item.

That algorithm calculates following:
the auction winners,
the winning bid price that is a single item price,
the auction selling price and
the auction statistics displaying bids amounts grouped by bid levels from provided auction parameters and participants' bid values.

The Auction System Components and its Parameters

Figure 3:
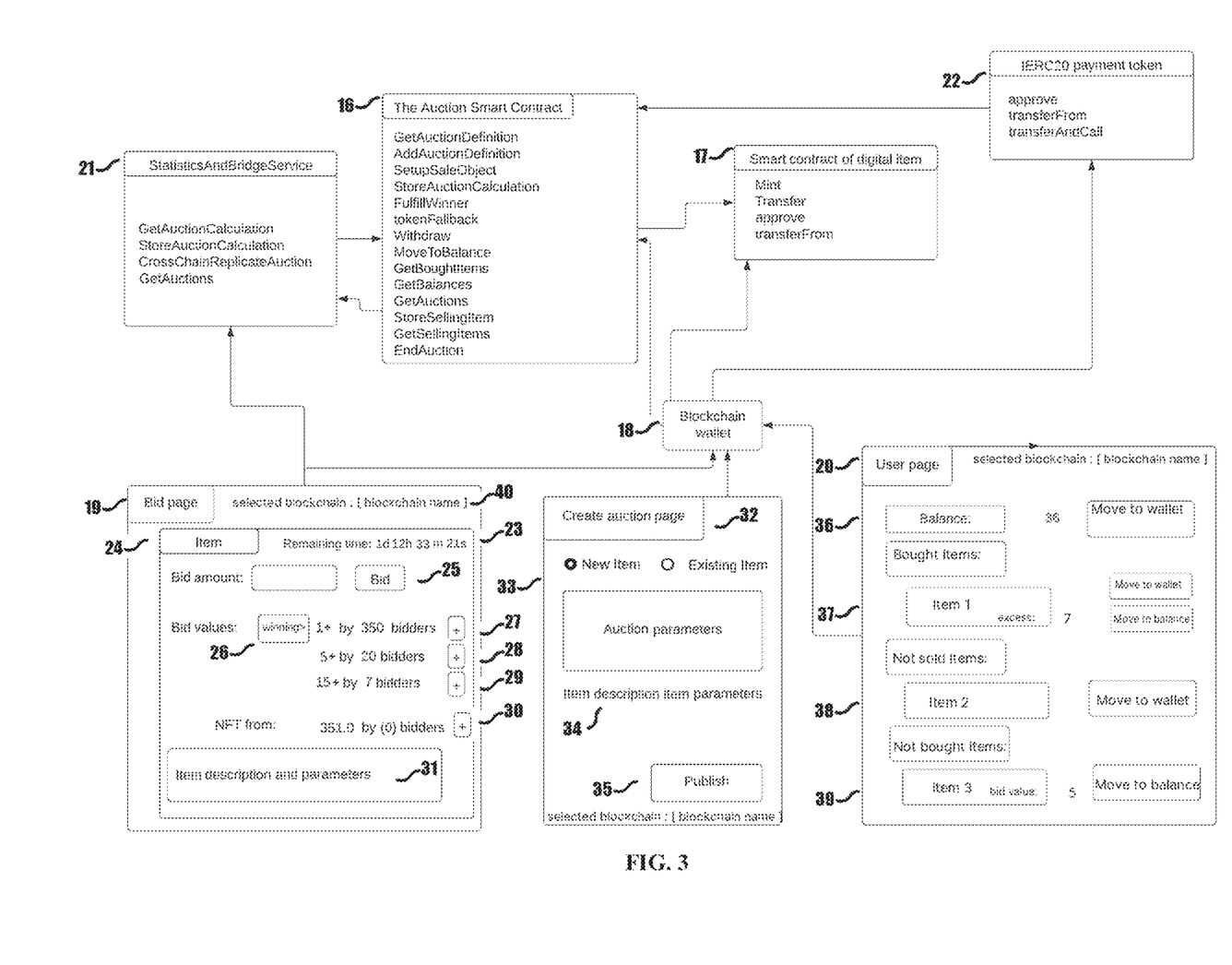
FIG. 3 is the system diagram containing the auction system components and items involved in the auction transactions and calculation operations.

The auction system contains following components (FIG. 3):

The Auction Smart Contract (auction smart contract) 16 deployed on all supported blockchains.

The smart contract contains methods 16—that allows to create the auction, bid, store auction calculation, withdraw tokens, and move bought items to the wallet. It contains following methods:
 GetAuctionDefinition—returns auction with its parameters,
 AddAuctionDefinition—adds new auction,
 SetupSaleObject—setups all auction and item's parameters,
 StoreAuctionCalculation—stores auction calculation,
 FulfillWinner—transfers the collected value into seller balance,
 tokenFallback—transfer tokens into the Auction Smart Contract when bidding,
 Withdraw—withdraws token balance and smart contract into user wallet,
 MoveToBalance—moves user's excess bid values and unbought bid values into the user balance,
 GetBoughtItems—lists all bought items by user,
 GetBalances—returns user token balances,
 GetAuctions—lists user auctions,
 StoreSellingItem—moves the selling item into the Action Smart Contract,
 GetSellingItems—lists user selling items,
 EndAuction—terminates auction The Create Auction Page 32—which allows to interact with the Auction Smart Contract and create the auction with parameters.

the Bid Page 19—which allows participants to participate in auction and see the auction live statistics and estimation.

the User Page 20—which allows access to bought items, not sold items, not bought items and the participant balance.

The Statistics and Bridge Service 21 that calculates auctions providing live statistics and bid suggestions. It also stores the auction results into the smart contract when an auction is ended. It contains following methods:
 GetAuctionCalculation—returns the calculated auction statistics,
 StoreAuctionCalculation—stores auction calculation in the Auction Smart Contract,
 CrossChainReplicateAuction—replicates auction on supported blockchains and
 GetAuctions—returns ongoing auctions The auction system uses following external elements involved in the auction transaction:
 IERC20 compatible payment token (20)—is an auction currency token that contains the following IERC methods: both "approve" and "transferFrom" or "transferAndCall" and the Smart Contract of Digital Item (17) that is the selling item. This could be any smart contract item 66 compatible with (but not limited to): ERC-721, ERC-777, ERC-1155 allowed by the administrator. It should contain at least the following methods: mint, transfer, approve, transferFrom.

In order to bid—the auction participant needs to use his own blockchain wallet 18 and use accepted digital currency (token) 65 by the auction on the Bid Page (19). The selling item is a digital item that could represent any digital assets (allowed by system administrator 66)—like (but not limited to) blockchain smart contracts containing—NFTs, images, links or representing rights like property rights, intellectual rights or ownership. In order to start auction seller must provide mandatory parameter:

The selling item name, description and parameters (34).

Item name is the name of the item provided by the seller. Depending on the item type—whether it's an NFT, access token or any other digital asset—the item has its own set of parameters describing it. Some of them could be put in item description, but some of them are stored as parameters. NFTs have parameters for image/video, title, description, creator and multiple item specific additional parameters that in case of gaming NFT may include game name, skills and others. In case of the broadcast transmission access rights it may include date and time of a transmission and a type of video quality while other access rights may need a date range only.

The auction system allows the seller to dynamically specify auction item specific attributes as key-value dictionary, allowing creation of any item specific parameters.

Figure 5:
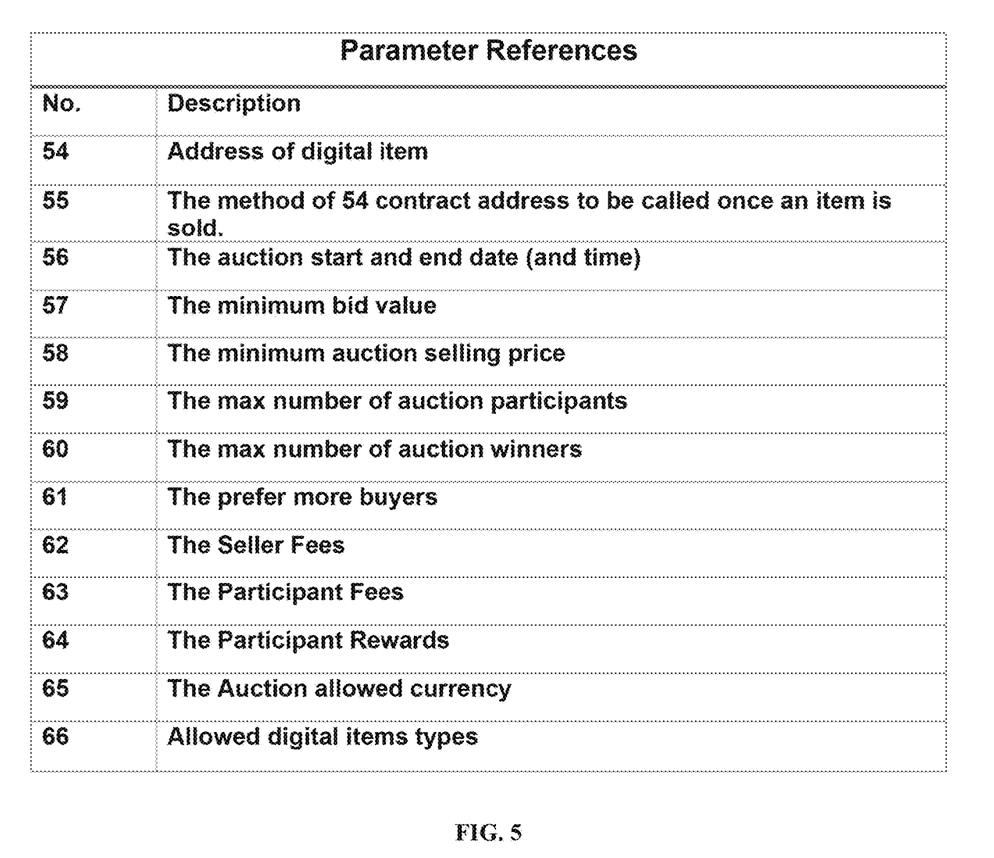
FIG. 5 shows an index of parameters as used in various embodiments of the invention.

Seller could also provide optional parameters:
54 smart contract address of digital item—the address of an existing contract that represents an item to be sold. If not provided—a default item contract will be created as an ECR1155 compliant contract.
55 The method (of 54 the contract address) to be called once an item is sold.
56 auction start and end date (and time)—Those parameters define when the auction starts and ends.
57 minimum bid value—The minimum bid value (in 65 currency) that participants can use when bidding to participate in the auction.
58 minimum auction selling price—The minimum price (in 65 currency) that auction needs to reach.
59 max number of auction participants—Maximum number of participants that can bid separately on each of the supported blockchains. If set to 0 (default) then no limit is specified.
60 max number of auction winners—Maximum number of winners. If set to 0 (default) then no limit is specified.
61 prefer more buyers—Parameter for choosing subset of winning participants.

Not providing optional parameters causes the auction to use default values provided by the system administrator.

System administrator could provide default values for above and following optional parameters:
62 Seller Fees—Fee that the auction system deducts from the auction selling price.
63 Participant Fees—Fee that the auction system deducts from participant bid
64 Participant Rewards—Reward for the auction participants.
65 Auction allowed currency—Allowed digital currency for the auction represented by ERC20 compliant token.
66 Allowed digital item types—Allowed item types (smart contract interfaces) that can be used as selling item—e.g. ERC-721, ERC-777, ERC-1155

The auction system uses the Auction Smart Contract 16 for storing auction information and blockchain tokens 22 for payment and blockchain smart contracts as the selling item assisted by algorithm.

It also uses off-chain Statistics and Bridge Service 21 to provide auction calculation and statistics. It does not have blockchain-related limits regarding the amount of data processed in one transaction.

Auction States

The auction can be in the following states FIG. 2: Created, Started, Ended, Calculated. In addition to that it can have status "success" or "failed" in each state.

The Auction can be ended in following cases:
the auction end date was reached according to the auction start and end date (and time) 56 or
the auction was ended by the seller. It has status "failed" using FIG. 3 16 EndAuction method or
the auction was ended by the system administrator using FIG. 3 16 EndAuction method. It has status "failed" in that case.

Create Auction Page 32 is used to create a new auction to sell a new or existing smart contract (e.g. NFT). In case of new smart contract following steps are performed: 33 the auction and item parameters are provided FIG. 4 pos 33 & 34 and the Publish button is clicked (35). Then the Create Auction Page connects to the Auction Smart Contract 16 via blockchain wallet 18 and calls its SetupSaleObject method and stores auction and item parameters. In case of selling an existing smart contract the flow is following: 33 the auction parameters are provided, then the transfer of the selling item into the Auction Smart Contract is performed by calling "approve" method on the 17 Smart contract of digital item and by calling the StoreSellingItem method in the Auction Smart Contract when "Publish" button is clicked (35). Afterwards, the Create Auction Page connects to the Auction Smart Contract 16 via blockchain wallet 18 and calls its SetupSaleObject method.

The Auction Smart Contract method SetupSaleObject initially calls AddAuctionDefinition method and creates new auction id and AuctionCreated event is emitted by the Auction Smart Contract, the auction state is set to "Created" 12. Afterwards it stores all auction parameters on the current blockchain and the auction state is set to "Started" 13 on the current blockchain, and becomes ready for bidding.

When the auction end date passes, the Auction Smart Contract 16 method StoreAuctionCalculation is called by the Statistics and Bridge Service to store the auction results and the auction becomes Calculated 15 with status. If the auction is Calculated with status success—the FulfillWinner method can be called by each winner (using UI buttons 27 & 28) that cause won items to be moved to the winner blockchain wallet.

Auction Bidding

Auction bidding can be performed on supported blockchains. Supported blockchains are those blockchains that the Auction Smart Contract has been deployed on. The Bid Page 19 allows to put a bid, and interacts with the currently selected supported blockchain (40) via blockchain wallet (18). Following checks are performed (by the Auction Smart Contract) before bid is accepted:
check if the bid date and time is within allowed auction period 56,
check if the bid value is greater or equal the minimum bid value 57 and check if the max number of the auction participants are not reached 59.

The Item bid page 24 Allows bidders to put a bid representing amount of payment token 22 (that are accepted by the parameter 65) and press the Bid button 25 in order to send an offer to the Auction Smart Contract. The page also allows to select suggested bid values from auction statistics 27, 28, 29, 30 in order to follow other bidders. After clicking the Bid button, the bidder needs to connect to his wallet to start the transaction using browser web3 wallet (that works with supported blockchains) and accept blockchain transaction. When the transaction is started and all conditions are met—and the bidder has enough payment tokens, then the bid can be accepted by the Auction Smart Contract and the offered amount of payment tokens are transferred from the bidder's wallet into the Auction Smart Contract 16 and locked until the auction is Calculated. If the bidder bids again, the whole process is similar with a following difference that his "offer" is increased by the new bid value.

FIG. 3 Shows a bidding page with 24 the item, the auction remaining time 23, and its description with parameters 31.

After bid value is transferred to the Auction Smart Contract, the events are published by the Action Smart Contract, and are used later to update statistics on the Item Bid Page 24.

Auction Live Statistics

Below bidding is a calculation of the auction 26 that shows the current "stage" of the auction defined as:
the current winning bid value 26 and
the number of winners 27 & 28 & 29 grouped by bid levels—showing amount of bid values that are greater or equal to given bid level. "1+ by 350 bidders" means that 350 bidders put at least bid value equal to 1 payment token (or more).

It summarizes the auction by displaying the number of bid values that are greater or equal than the presented bid value 27 & 28 & 29, marking the current winning bid value 26. It allows to use one of those bid values (27, 28, 29, 30) by clicking the button next to the statistic.

It also suggests the bid price that currently the bidder needs to use in order to be the only owner of the digital item 30 (to buy a NFT with supply 1/1).

The Statistics and Bridge Service 21 listens to the AuctionBid events on supported blockchains and for each AuctionBid event performs a new calculation and sends back results to the Bid page providing live auction statistics and the winning bid calculation.

As a result of the auction statistics on the Bid Page 19 are being refreshed each time a new bid is done on a supported blockchain.

Auction Creation

Auction is created using the Create Auction Page, that is an web interface that interacts with the Auction Smart Contract deployed on supported blockchains. The web page displays selected blockchain below the Publish Button 35. The auction related data is stored in the Auction Smart Contract and also in the Statistics and Bridge Service. Web Page user needs to use blockchain web3 wallet when performing actions like publishing auction or bidding auction. 33 User provides the auction parameters (for new or existing item). The item description and its parameters 34 can be provided or could be loaded from existing NFT.

Depending on user choice—the Create Auction page allows creation of a new digital item or to use an existing digital item (allowed by the parameter 66). Finally, allows creating the auction 35 by interacting with the Auction Smart Contract using 18 owned wallet. The web page detects if the wallet is connected to the supported EVM blockchain and only in that case allows that operation to complete. The Statistics and Bridge Service 21 monitors supported blockchains and detects new auctions via AuctionCreated events emitted by the Auction Smart Contract 16. The service monitors all The Auction Smart Contract instances on supported blockchains for the Auction Smart Contract auction's events that informs about auction progress. In case of new auction being created—all auction parameters (of new or existing item) 33 are stored in the database of Statistics and Bridge Service.

The Auction Smart Contract Auction's Events

The Auction Smart Contract produces following events that are monitored by the Statistics and Bridge service:
AuctionCreated—informs about the auction that was created on the blockchain
When the Statistics and Bridge Service receives that event it replicates the auction with its parameters on supported blockchains giving the possibility for bidders to use all supported blockchains to bid. The service also stores in db information about the auction id and auction end date (using UTC time) of the auction. When that date and time passes—the service makes again the calculation and stores it in the Auction Smart Contract by calling 16 using StoreAuctionCalculation method.
AuctionReplicated—the event acknowledges that the auction was successfully replicated on the blockchain.
AuctionBid—the event informs about a new bid on the auction on the blockchain. When the Statistics and Bridge Service receives that event it performs auction calculation with statistics so the Bid Page 19 could receive updated statistics about the auction and provide bid suggestions (27, 28, 29, 30). The Statistics and Bridge Service stores in db the history of bidding on all supported blockchains.

Auction Winners Calculation

Figure 4:
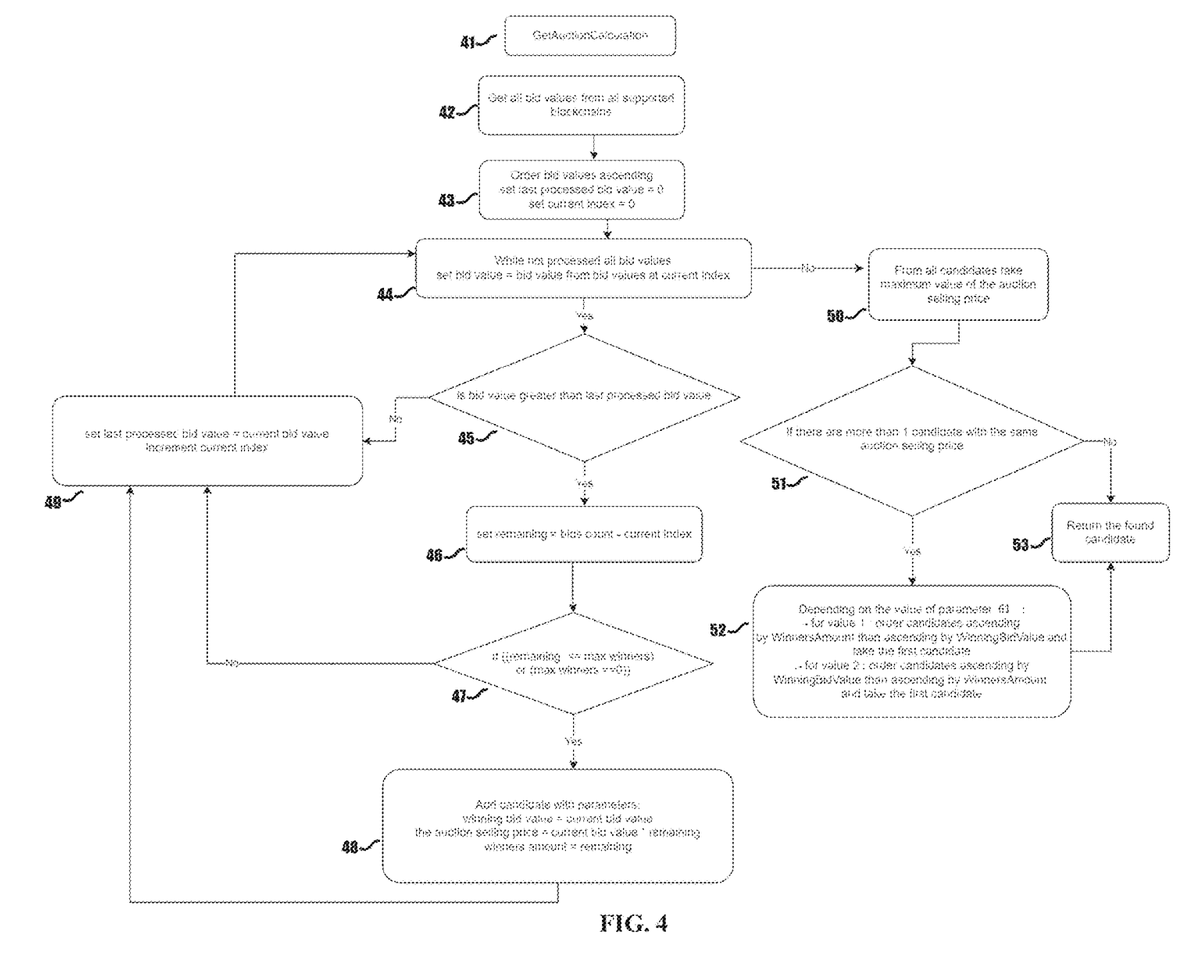
FIG. 4 is the algorithm of finding the auction winners, largest sum worth and winning bid value. It also returns auction statistics.

Algorithm is not limited to selling only one digital item to one winner, but—depending on the auction parameters (59 maximum number of auction participants & 60 maximum number of auction winners) and number of auction participants and their bid values—the algorithm could calculate winners.

As a result of this, participants bid values, the value of parameters 59, 60 and 61 shape the amount of winners according to the algorithm 41.

"Auction Selling Price", "Auction Winning Bid Price" and Winners Calculation

Winning bid price—is the bid value taken from all bid values and calculated by the algorithm—starting from which all bidders that put a bid value greater or equal to the winning bid price—"won the auction". The winning bid price is calculated by the Statistics and Bridge Service 21 using the algorithm 41.

The Auction selling price—is the price for the auction that is a sum of all winning bid values according to the algorithm. Each bidder that has put a bid with value greater or equal to the winning bid price becomes a winner (with max number of winner's limitation 60).

In case of a failed auction—the digital item isn't sold at all. In case of successful auction the algorithm looks for winners within auction participants.

The Auction Calculation Algorithm

The algorithm has following assumptions: Each winner buys a digital copy at the same single item price named winning bid price. The winning bid price is such a bid value that when summed up (from all bidders who have put greater or equal bid value) gives the largest sum, named the auction selling price. The Algorithm may use up to 100% of the participant's bid value to find the winning bid price. The auction selling price is calculated by discovering such bid value from participants bid values that multiplied by amount of bidders who put equal or greater bid value gives the largest sum worth. Parameters 58 (minimum auction selling price) and 60 are also applied while calculating the largest sum worth—the auction selling price must be equal or greater than minimum auction selling price 58. The algorithm creates the subsets of the sums of participants' bid values (FIG. 1) taking up to 100% of each bid value to calculate item price.

FIG. 1 shows 5 bidders (Adam, Alice, Ben, John, Lisa) who have put their bids:

Adam put bid value equal to 2 (FIG. 1-6),
Alice put bid value equal to 3 (FIG. 1-7),
Ben put bid value equal to 6 (FIG. 1-8),
John put bid value equal to 6 (FIG. 1-8),
Lisa put bid value equal to 7 (FIG. 1-9), The algorithm tries to find winning bid price by checking from smallest to largest bid value doing following sums:

sum of bid values that are greater or equal to 2 (Adam's bid). It makes a sum of 2+2+2+2+2 resulting in a candidate for auction selling price=10 and a candidate for winning bid value 2, than sum of bid values that are greater or equal to 3. It makes a sum of 3+3+3+3 resulting in a candidate for auction selling price=12 and a candidate for winning bid value 3, than sum of bid values that are greater or equal to 6. It makes a sum of 6+6+6 resulting in a candidate for auction selling price=18 and a candidate for winning bid value 6, than sum of bid values that are greater or equal to 7. It makes a sum of 7 resulting in a candidate for auction selling price=7 and a candidate for winning bid value 7.

Then it finds the largest sum worth from those candidates' subsets. In the FIG. 1 example the auction selling price is 18 (FIG. 1.10) and winning bid price is 6 (FIG. 1.8) and the winners are Ben, John and Lisa (FIG. 1.11) because 18 is the largest sum worth, taken from provided bid values.

FIG. 4 shows the auction calculation algorithm that calculates the largest sum worth.

The algorithm is used when an auction is open for bids—to provide live statistics at the Bid Page (19). Same algorithm is used to provide that information after the auction state is "ended" (14) in order to store (final) calculation in the Auction Smart Contract (16) using StoreAuctionCalculation. After successful execution of the StoreAuctionCalculation method—the auction becomes calculated (15) with status success. The Auction Smart Contract emits an AuctionCalculated event in that case. The algorithm 41 takes all bids from all supported blockchains (42). In case of multiple bids by the same blockchain wallet address the participant bid value is summed up separately for each blockchain, and multiple bids of same wallet on the same blockchain are increasing the bidder's bid value.

Then, those participants' bid values are ordered ascending 43. The "last processed bid value" variable is set to 0 and the "current index" variable also is set to 0. Afterwards all ordered bid values are processed 44 starting from the bid value at index 0. 45 If the current bid value is greater than the "last processed bid value" the algorithm sets "remaining" as the bids count decreased by current index. Otherwise 49 the "last processed bid value" is set to the "current processed bid value" and the "current index" is incremented, and the loop takes next bid value and the process repeats 44.

47 If the "remaining" is lower or equal to the "max winners" (60) or "max winners" is equal to 0 then the following candidate is stored 48:

the "winning bid value" is set to the "current bid value",
the "auction selling price" is set to the "current bid value" multiplied by "remaining" variable value and
the "winners amount" is the "remaining" variable value.

49 Afterwards the "last processed bid value" is set to the "current processed bid value" and the "current index" is incremented and the process repeats 44.

When all bid values are processed 44—from collected candidates—the candidates with the largest "auction selling price" are selected 50.

The algorithm at this step 50 removes all candidates with the auction selling price lower than 58 (minimum auction selling price). If there's only one candidate—it's returned 53 as the result of the GetAuctionCalculation function (41) together with the list of (up to 10) remaining candidates (ordered descending by calculated candidate's auction selling price). If there are more candidates with the same largest auction selling price than the parameter 61 is taken into consideration:

if has value 1—those selected candidates are ordered ascending by the "winners amount" than ascending by the "winning bid value" otherwise if has value 2—those selected candidates are ordered ascending by the "winning bid value" than ascending by the "winners amount".

Afterwards from such ordered candidates list the first candidate is taken and it's returned 53 as the result of the GetAuctionCalculation function 41 together with the list of (up to 10) remaining candidates (ordered descending by calculated candidate's auction selling price). The chosen candidate contains the "winning bid price" and "auction selling price" and "winners amount".

If there are no candidates—the auction becomes "ended" with status failed.

The list of bids amounts grouped by bid value levels are used later on the Bid Page to display estimated bid options 27, 28, 29, 30.

Auction Results

When the auction is ended 14—it waits to be calculated by the Statistics and Bridge Service. Calculation allows to find winners, the auction winning bid price and the auction selling price. The Statistics and Bridge Service calculates those parameters using described algorithm 41 and stores result in the Auction Smart Contract 16 calling StoreAuctionCalculation on each supported blockchain.

Successful Auction

When the auction is calculated and get "success" status auction winners are able to get the sold digital item 17 using User Page 20.

If the bid value of a winner was higher than the "auction winning bid price"—then that winner will get an option to be refunded (FIG. 3 pos 37) by moving excess value to the balance and later to the wallet. If the participant is not a winner—he will get an option to be refunded (optional participant fees 63 and participant rewards 64 will be applied and reduce or increase refund value) by moving the bid value 39 to the balance. Auction seller will get the "auction selling price" decreased by (optional) seller fees 62 in the balance 36.

Each winner can move bought digital item, excess payment token balance and (a seller) unsold items to own wallet (FIG. 3 pos 37, 38, 39).

Unsuccessful Auction

When the auction has status "failed" all participants bid values are unlocked and could be refunded (applying optional participant fees 63) by moving to the user balance FIG. 3 pos 39.

The User Page

The User page (20) allows to:

Move collected balance to blockchain wallet 36,

Move bought items to wallet and excess to the balance 37,

Move not sold items to wallet 38 and

Move tokens from auction where item was not bought— to the balance 39.

User page interacts with the Auction Smart Contract using the blockchain wallet connected to the selected supported blockchain.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of various embodiments is intended to be illustrative, but not limiting, of the scope of the embodiments, which is set forth in the following claims.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

It will also be appreciated that such development effort might be complex and time-consuming, but would nevertheless be a routine undertaking for those of ordinary skill in the field of the appropriate art having the benefit of this disclosure.

Accordingly, the claims appended hereto are not intended to be limited by the disclosed embodiments, but are to be accorded their widest scope consistent with the principles and features disclosed herein.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

INDUSTRIAL APPLICATION

The present invention applies to auctioneering sector. It brings onboard a new auction system incorporating blockchain and smart contracts, which operates using block-chain and smart contracts and non-fungible tokens and fungible tokens built on EVM compliant blockchains and off-chain service.

What is claimed is:

1. A computer-implemented auction system, comprising:
an auction smart contract deployed on supported blockchains,
blockchain web wallets each connected to one of the supported blockchains,
an off-chain statistics and bridge service, and
a web interface comprising:
a create auction page configured to allow a seller to create an auction by interacting with the auction smart contract using a blockchain web wallet of the seller, and
a bid page configured to allow bidders to participate in the auction by interacting with the auction smart contract using a blockchain web wallet of each bidder of the bidders,
wherein the auction smart contract is configured to:
receive a digital selling item via a blockchain transaction from the a blockchain web wallet of the seller to create the auction, and
receive a bid value being an amount of blockchain payment tokens, via a blockchain transaction from the a blockchain web wallet of each bidder of the bidders of the auction,
wherein the off-chain statistics and bridge service is configured to:
dynamically calculate, using an algorithm, a winning bid price, an auction selling price of the digital selling item, and one or more winners of the digital selling item among the bidders, by processing all bid values received from the blockchain web wallets of the bidders of the auction, and store the winning bid price, the auction selling price and the winners amount into the auction smart contract, wherein the calculation includes ordering all the bid values ascendingly, and iteratively determining the winning bid price which is a bid value that, when multiplied by the number of all bidders of the bidders, from which an equal or greater bid value was received, gives a largest value, wherein the largest value is determined as the auction selling price, and wherein each bidder of the bidders, from which a bid value greater or equal to the winning bid price was received, is determined as a winner, and wherein the system is configured to:

send, from the auction smart contract to the blockchain web wallet of the seller, via a blockchain transaction, an amount of the blockchain payment tokens equal to the auction selling price, if there is one winner, send, via a blockchain transaction, the digital selling item in a form of a non-fungible token from the auction smart contract to a blockchain web wallet of the winner, and if there are two or more winners, send, via a blockchain transaction, a copy of the digital selling item in a form of a fungible token from the auction smart contract to a blockchain web wallet of each winner.

2. The auction system according to claim 1, wherein the system is configured to:

send excess blockchain payment token balance from the auction smart contract to each winner blockchain web wallet from which a bid value greater than the winning bid price was received.

3. The auction system according to claim 1, wherein the system is configured to:

refund, to a blockchain web wallet of each bidder that sent a bid value less than the winning bid price, the bid value from the auction smart contract.

4. The auction system according to claim 1, wherein the auction smart contract is configured to block the received bid value until the auction is ended and the winning bid price, the auction selling price and the one or more winners are calculated.

5. The auction system according to claim 1, wherein the off-chain statistics and bridge service is configured to provide live auction calculation statistics, which shows a current stage of an auction defined as:

a current winning bid value, current number of winners, and a bid value that currently a bidder needs to send in order to be an only winner.

6. The auction system according to claim 5, wherein the bid page is configured to allow the bidders to see the live auction calculation statistics, and wherein the web interface further comprises:

a user page configured to allow auction participant's access to bought digital selling items, not sold digital selling items, not bought digital selling items, and a participant payment token balance.

7. The auction system according to claim 1, wherein the auction smart contract is further configured to:

receive, from the blockchain web wallet of the seller, auction parameters so as to create the auction, wherein the auction parameters comprise one or more of the following:

auction start and end date, a minimum bid value that the bidders can use when bidding to participate in the auction, a minimum auction selling price that the auction needs to reach, a maximum number of bidders that can bid separately on each of the blockchains, a maximum number of auction winners.

8. The auction system according to claim 7, wherein the system is configured to end the auction when the auction end date was reached.

9. The auction system according to claim 1, wherein the system does not limit bid values depending on bid values already received by the auction smart contract.

10. A computer-implemented auction system, comprising:

blockchains, a blockchain smart contract of a digital item that is a selling item, an auction smart contract deployed on the blockchains and configured to store auction information and blockchain payment tokens and the blockchain smart contract assisted by blockchain operated algorithm, a blockchain web wallet of each auction participant of the auction participants comprising a seller and bidders, the blockchain web wallet connected to and operating using one of the blockchains, and an off-chain statistics and bridge service, the system being configured to:

create, by the seller, an auction for selling the blockchain smart contract, by interacting, via a create auction page of a web interface, with the auction smart contract using the blockchain web wallet of the seller to store auction parameters and transfer the blockchain smart contract into the auction smart contract via a blockchain transaction;

send, by each bidder of the bidders, a bid being a bid value representing an amount of the payment tokens to the auction smart contract by initiating, via a bid page of the web interface, a corresponding blockchain transaction using the blockchain web wallet of the bidder, by the auction smart contract, accept the bid of each bidder, transfer the amount of the payment tokens from the blockchain web wallet of each bidder into the auction smart contract, and block the transferred amount of the payment tokens until the auction is ended and calculated, when the auction is ended, dynamically calculate, by the off-chain statistics and bridge service, using the algorithm, a winning bid price, an auction selling price of the digital selling item, and one or more winners of the digital selling item among the bidders, wherein the calculation includes ordering all the bid values ascendingly, and iteratively determining the winning bid price which is a bid value that, when multiplied by the number of all bidders of the bidders who sent equal or greater bid value, gives a largest value, wherein the largest value is determined as the auction selling price, and wherein each bidder of the bidders, which sent a bid value greater or equal to the winning bid price, is determined as a winner, store, by the off-chain statistics and bridge service, the winning bid price, the auction selling price and the winners amount into the auction smart contract, send, from the auction smart contract to the blockchain web wallet of the seller, via a blockchain transaction, the blockchain payment token amount equal to the auction selling price, send, via a blockchain transaction, from the auction smart contract to the blockchain web wallet of each winner that sent a bid value greater than the winning bid price, if any, excess payment token amount, if there is one winner determined, send, via a blockchain transaction, from the auction smart contract to the blockchain web wallet of the winner, the blockchain smart contract containing a non-fungible token, and if there are two or more winners, send, via a blockchain transaction, from the auction smart contract to the blockchain web wallet of each winner, the blockchain smart contract containing a fungible token.

11. The auction system according to claim 10, wherein the system is configured to:

refund, from the auction smart contract to the blockchain wallet of each bidder that sent a bid value less than the winning bid price, if any, the bid value.

12. The auction system according to claim 10, wherein the system does not limit bid values to be sent by each bidder depending on bid values already sent by other bidders.

13. The auction system according to claim 10, wherein the auction parameters comprise auction end date, and the system is configured to end the auction when the auction end date was reached.

* * * * *